Patented Mar. 29, 1949

2,465,568

UNITED STATES PATENT OFFICE 2,465,568

PYRIMIDINE COMPOUNDS

Frederick Robert Basford, Francis Henry Swinden Curd, Francis Leslie Rose, and Harry Tacon Openshaw, Manchester, and Roy Hull and Alexander Robertus Todd, Cambridge, England, assignors to Imperial Chemical Industries Limited, a corporation of Great Britain No Drawing. Application February 18, 1946, Serial No. 648,552. In Great Britain February 27, 1945

10 Claims. (Cl. 260—251)

This invention relates to the manufacture of new pyrimidine compounds which are useful as chemotherapeutic agents, particularly as antimalarial agents, and as intermediates in the manufacture of such agents.

We have found that new pyrimidine compounds, useful in the manner indicated and having the formula —

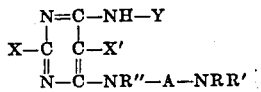

wherein X and X' may each represent hydrogen or a hydrocarbon radical, Y is hydrogen or a hydrocarbon radical which may optionally bear one or more non-acidic substituents, R" is hydrogen or an alkyl or simply substituted alkyl group, for example an alkoxyalkyl or dialkylamino group, A is a linking group which is aliphatic or alicyclic or aliphatic-carbocyclic and may be substituted, for example, by hydrocarbon radicals, hydroxy or alkoxy groups or dialkylamino-alkyl groups, and, where A or part of A is an aliphatic chain it may be interrupted by oxygen, nitrogen or sulphur atoms, and NRR' is a strongly basic amino or substituted amino group such as alkylamino or dialkylamino or piperidino or other strongly basic nitrogen-containing heterocyclic group, may be made by a process comprising the interaction of a compound of the formula —

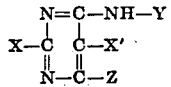

with a diamine of the formula R"NH—A—NRR', the various symbols in these formulae having the same meanings as before and Z representing a labile group, such as a halogen atom or a hydrocarbon radical which is attached by an ether or thioether linkage, for example an alkoxy, aryloxy or alkylmercapto group.

It will be appreciated that where it is desired to introduce a substituent of the form —NR"—A—NHR, R being hydrogen or a hydrocarbon radical, it will usually be necessary first to protect the terminal amino group of the diamine, as by acylation, and then to remove the protecting group after the condensation with the amino-pyrimidine compound has been effected. This procedure is, in fact, a particular embodiment of one of the modified processes hereinafter to be described.

The reaction is conveniently effected by heating the reagents together, optionally in presence of a solvent or diluent. The two reagents may both be used as free bases or, if desired, the aminopyrimidine derivative may be used as the free base and the diamine in the form of a salt, such as the hydrochloride or the acetate, or, alternatively, we may use the free diamine and a salt of the aminopyrimidine derivative. Also, if desired, the reaction may be carried out in the presence of an acid-binding agent such as sodium hydroxide.

The reagents are conveniently, but not necessarily, used in approximately stoichiometric proportions. If desired, a large excess of the diamine may be used so that it functions as a solvent; indeed with the diprimary diamines it is preferable to work in this way.

Of the 4-halogeno-6-aminopyrimidine-derivatives needed as starting materials 4-chloro-6-amino-2-methylpyrimidine and 4-chloro-6-amino-2:5-dimethylpyrimidine are known compounds; see, for example, Berichte, 1938, vol. 71, p. 92, and 1942, vol. 75, p. 755. Others may be made by the general method there described, namely by interaction of an amino-compound Y—NH$_2$ with the appropriate 4:6-dihalogenopyrimidine compound, itself obtained by halogenation of the corresponding 4:6-dihydroxy derivative with, for example, phosphorus oxychloride or phosphorus oxybromide. The alternative starting materials containing ether or thioether linkages in the 4-position can readily be made by reaction of the 4-halogeno derivatives with the appropriate hydroxy or mercapto compounds or with alkali metal derivatives of such compounds.

As examples of 6-aminopyrimidine derivatives suitable for use in this process there may be mentioned 4 - chloro - 6 - amino-2-methylpyrimidine, 4 - chloro - 6 - amino-2:5-dimethylpyrimidine, 4-chloro-6-amino-5-methylpyrimidine, 4 - chloro-6 - p - chloroanilino - 2 - phenylpyrimidine, 4 - chloro-6-p - methoxyanilino - 2 - methylpyrimidine, 4-chloro-6-p-chloroanilino-2-methylpyrimidine, 4-chloro-6-p-nitroanilino-2-methylpyrimidine, 4-chloro-6-(6'-bromo-2'-naphthylamino) - 2-methylpyrimidine, 4 - chloro-6-p-methoxyanilino-2:5-dimethylpyrimidine, 4-chloro-6-p-chloroanilino-2:5-dimethylpyrimidine, 4-chloro-6-p-chloroanilino-2-methyl - 5 - ethylpyrimidine and 4-chloro-6-p-methoxyanilino-2- methyl-5-ethylpyrimidine and also the corresponding 4-bromo-, 4-ethoxy-, 4-phenoxy and 4-methylmercapto compounds.

As examples of suitable diamines there may be mentioned ethylenediamine, 2-dimethylamino-ethylamine, 2-diethylaminoethylamine, 3- diethylaminopropylamine, 3-dimethylaminopropylamine, 4-diethylaminobutylamine, 4-diethylamino-1-methylbutylamine, 3-diethylamino-1:2-dimethylpropylamine, 3 - diethylamino - 2 - hydroxypropylamine, 2-methylaminoethylamine, 3-butylaminopropylamine, 3 - ($\beta$ - diethylaminoethyloxy)-propylamine, 3-($\beta$-diethylaminoethylmercapto)-propylamine, 5 - diethylamino - 1 - aminopentane, 2-pyrrolidinoethylamine, 1:3-bis-diethylamino-2-aminopropane, N-ethyl-N-$\beta$-diethylaminoethyl-ethylenediamine, 2-piperidinoethylamine, 3 - piperidinopropylamine, p - dimethylaminoethoxyaniline, p-diethylaminoethoxyaniline, p-diethylaminoethylmercaptoaniline, 3-diethylamino-2:2-dimethylpropylamine, 3-dibutylaminopropylamine, N-methyl-N-$\beta$-diethylaminoethyl-propylenediamine, $\beta$ - p.peridino-$\beta$-methyl-ethylamine, N-methyl-N'-diethyl-ethylenediamine, N-ethyl-N'-diethylethylenediamine and bis-($\beta$-diethylaminoethyl)-amine.

A further feature of the invention is a modified process wherein the basic substituent —NR"—A—NRR' is introduced by stages. Thus the 6-aminopyrimidine derivative carrying a labile group in the 4-position is brought into reaction with an amino compound of the formula NHR"—A'—B where A' represents either the whole or part of the linking group A defined above and where B stands for a reactive group which is then converted directly or indirectly by methods involving the step of reaction with ammonia or an amino compound into the group NRR' or into a group —A"—NRR' such that A' and A" together constitute the linking group A. For example, the group B may be a hydroxy group or a derivative thereof which is, or is readily convertible to, a reactive ester thereof, such as a halide, this then being brought into reaction with an amine NHRR' or an amino substituted amine NH$_2$—A'''—NRR' or a hydroxy or mercapto substituted amine HO—A'''—NRR' or HS—A'''—NRR') or an alkali metal derivative of such a hydroxy or mercapto compound) such that A'—NH—A''', A'—O—A''' or A'—S—A''' constitutes the linking group A previously mentioned. Another alternative is to bring the labile group in the 4-position of the aminopyrimidine compound into reaction with an acylated diamine NHR"—A'—NHAc and then to hydrolyse off the acyl group. Further, if desired, a terminal amino group may be modified, as by alkylation, conversion to a heterocyclic group such as piperidino or by bringing it into reaction with a halogeno-substituted amine Hal—A"—NRR' such that A'—NH—A''' constitutes the linking group A.

The new compounds are viscous oils or crystalline solids. They are strongly basic and form colourless or pale yellow salts with mineral and organic acids. The salts with mineral acids such as hydrogen halides, sulphuric and phosphoric acids or with lower organic acids such as acetic, lactic, tartaric, and lower alkanesulphonic acids (e. g. methanesulphonic acid) are water-soluble. The salts with acids of higher molecular weight, such as methylene bis-2:3-hydroxynaphthoic acid and methylene bis-salicylic acid are more sparingly soluble in water.

The following examples, in which the parts are by weight, illustrate the detailed practice of the invention.

Example 1

4 parts of 6-amino-4-chloro-2:5-dimethylpyrimidine and 10.4 parts of $\gamma$-dimethylaminopropylamine are heated together under reflux for 6 hours. The excess of the diamine is then distilled off under reduced pressure and the residue is dissolved in dilute hydrochloric acid. The solution is made alkaline by addition of caustic soda and the oil which separates is extracted with chloroform. The chloroform solution is dried over anhydrous sodium sulphate, the chloroform is distilled off and the residue is distilled in high vacuum whereby 6-amino-4-($\gamma$-dimethylaminopropylamino) - 2:5 - dimethylpyrimidine is obtained in the form of a very pale yellow viscous oil. This is dissolved in hot petroleum ether and the solution is cooled whereupon it separates in the form of a colourless hygroscopic solid of M.P. 89°–91° C. It forms a bis-3:5-dinitrobenzoate of M.P. 207.5°–209° C.

By starting with the same chloro-aminopyrimidine and working in the same manner, but using other appropriate diamines instead of the $\gamma$-dimethylaminopropylamine of Example 1, there are obtained the following further compounds.

Example 2

6-amino-4 - ($\beta$-diethylaminoethylamino)-2:5-dimethylpyrimidine of M.P. 82°–82.5° C.

Example 3

6-amino-4-($\gamma$-diethylaminopropylamino)-2:5 - dimethylpyrimidine of M. P. 99°–99.5° C.

By working in the manner described in Example 1 but using as starting materials 4-chloro-6-amino-2-methylpyrimidine and the appropriate diamines there are obtained the following further compounds.

Example 4

6-amino-4-($\delta$ - diethylamino - $\alpha$ - methylbutyl - amino)-2-methylpyrimidine which is a viscous oil which distils at 170° C. under a pressure of 10$^{-4}$ mm.

Example 5

6-amino-4 - ($\beta$ - diethylaminoethylamino) - 2 - methylpyrimidine which after distillation in vacuo and crystallisation from a mixture of benzene and light petroleum has M. P. 93.5°–94.5° C.

Example 6

6-amino-4-($\gamma$ - diethylaminopropylamino) - 2 - methylpyrimidine which after distillation in vacuo and crystallisation from a mixture of benzene and light petroleum has M. P. 91°–92.5° C.

Example 7

10.16 parts of 4-chloro-6-p-chloroanilino-2-methylpyrimidine, 11.6 parts of $\beta$-diethylaminoethylamine and 0.1 part of potassium iodide are stirred and heated together at 150–160° C. for 8 hours. The resulting melt is dissolved in dilute hydrochloric acid and the solution is filtered from a small amount of insoluble matter and then made alkaline with sodium hydroxide. The precipitate which is formed is filtered off and extracted with aqueous 5% acetic acid. The acetic acid extract is clarified with decolourising carbon, sodium hydroxide solution is added and the base which separates out is extracted with chloroform. The chloroform extract is dried over potassium carbonate and the chloroform is distilled off. There remains 6-p-chloroanilino-4-$\beta$-diethylaminoethylamino-2-methylpyrimidine which after crystallisation from petroleum ether (B. P. 100–120° C.) forms colourless needles of M. P. 148–149° C.

By starting with the same chloropyrimidine and working in the same manner but using other appropriate diamines instead of the β-diethylaminoethylamine of Example 7, there are obtained the following further compounds.

Example 8

6-p-chloroanilino-4-γ-diethylaminopropylamino-2-methylpyrimidine, colourless prisms of M. P. 128° C.

Example 9

6-p-chloroanilino-4-γ-dibutylaminopropylamino-2-methylpyrimidine, colourless needles, M. P. 93–94° C.

Example 10

6 - p-chloroanilino-4-γ-piperidinopropylamino-2-methylpyrimidine, colourless flat prisms, M. P. 110° C.

Example 11

6-p-chloroanilino-4-δ-diethylamino-α-methyl - butylamino-2-methylpyrimidine, colourless oil, B. P. 222–224° C./0.1 mm.; it forms a dipicrate which crystallises from β-ethoxyethanol in very small yellow plates, M. P. 149–151° C.

Example 12

6-p-chloroanilino-4- γ - (β' - diethylaminoethoxy)-propylamino-2-methylpyrimidine, colourless oil of B. P. 245–249° C./0.15 mm.; it forms a dipicrate which crystallises from β-ethoxyethanol as a yellow crystalline powder, M. P. 181–182° C.

The starting material used in Examples 7–12 above, namely, 4-chloro-6-p-chloroanilino - 2 - methylpyrimidine (M. P. 152° C. after crystallisation from a mixture of benzene and ligroin) can be made by interaction of p-chloroaniline with 4:6-dichloro-2-methylpyrimidine in glacial acetic acid for 20 hours at 40–50° C. As reaction proceeds the hydrochloride of the product separates out. The mixture is cooled to room temperature, 3 parts of sodium acetate are added and the whole is stirred until a clear solution is obtained. This is then poured into 250 parts of water and the precipitate is filtered off, washed and dried.

Example 13

25 parts of 4-chloro-6-p-methoxyanilino-2-methylpyrimidine, 25 parts of β-diethylaminoethylamine and 0.25 part of potassium iodide are stirred and heated together at 150–160° C. for 8 hours. The mixture is then cooled and dissolved in dilute hydrochloric acid and the solution is made alkaline with sodium hydroxide. The base which is precipitated is filtered off and dissolved in aqueous 5% acetic acid and the solution so obtained is clarified with decolourising carbon. Sodium hydroxide solution is then added and the base which separates is filtered off, washed with water and dried. There is thus obtained 6-p-methoxyanilino-4-β-diethylaminoethylamino-2-methylpyrimidine which on crystallisation from petroleum ether (B. P. 100–120° C.) forms colourless prisms of M. P. 146–148° C.

Example 14

By working in a similar manner to that described in Example 13 but using γ-diethylaminopropylamine instead of β-diethylaminoethylamine, there is obtained 6-p-methoxyanilino-4-γ-diethylaminopropylamino - 2 - methylpyrimidine which forms colourless flat prisms of M. P. 130° C.

Example 15

15 parts of 4-chloro-6-p-methoxyanilino-2-methylpyrimidine and 14.4 parts of δ-diethylamino-α-methyl-butylamine are stirred and heated together for 7 hours at 150–160° C. The mixture is then cooled and dissolved in dilute hydrochloric acid and the solution is made alkaline with sodium hydroxide and extracted with chloroform. The chloroform extract is shaken several times with 5% aqueous acetic acid, and combined acid extracts are made alkaline with sodium hydroxide and the base which is liberated is again extracted with chloroform. The chloroform solution is dried over potassium carbonate and the chloroform is dissolved off. There remains an oil which on stirring with petroleum ether (B. P. 40–60° C.) solidifies. This is 6-p-methoxyanilino-4-δ-diethylamino-α-methyl - butylamino-2-methylpyrimidine; after crystallisation from petroleum ether (B. P. 60–80° C.) it forms colourless prisms of M. P. 103° C.

The starting material used in Examples 13–15 above is conveniently made by heating together for one hour under reflux 16.3 parts of 4:6-dichloro-2-methylpyrimidine, 12.3 parts of p-anisidine, 80 parts of water, 20 parts of acetone and 2 parts of concentrated hydrochloric acid. The mixture is then cooled and the crystals which have separated out are filtered off. They are then suspended in warm alcohol and ammonia is added until all has dissolved and the liquor remains persistently alkaline. Water is then added and the base which separates out is filtered off, washed with water and crystallised from aqueous methanol. There is thus obtained 4-chloro-6-p-methoxyanilino-2-methylpyrimidine of M. P. 142–143° C.

Example 16

5.28 parts of 4-chloro-6-p-nitroanilino-2-methylpyrimidine and 4.6 parts of β-diethyl-aminoethylamine are heated together for 6 hours at 150–160° C. and the reaction mixture is then worked up as described in Example 15, whereby there is obtained 6-p-nitroanilino-4-β-diethylaminoethylamino-2 - methylpyrimidine; after crystallisation from benzene it forms yellow prisms with M. P. 130–131° C.

By starting with the same chloropyrimidine and working in a manner similar to that described in Example 16, but using other appropriate diamines instead of the β-diethylaminoethylamine, there are obtained the following compounds.

Example 17

6-p-nitroanilino-4 - γ - dimethylaminopropylamino-2-methylpyrimidine, which crystallises from toluene in small yellow needles of M. P. 169° C.

Example 18

6-p-nitroanilino - 4 - γ - dibutylaminopropylamino-2-methylpyrimidine which crystallises from petroleum ether (B. P. 80–100° C.) in small yellow needles of M. P. 101° C.

The 4-chloro-6-p-nitroanilino-2-methylpyrimidine used as starting material in Examples 16–18 is conveniently made by heating together 4.89 parts of 4:6-dichloro-2-methylpyrimidine, 4.55 parts of p-nitroaniline, 50 parts of acetic acid and 0.05 part of potassium iodide at 50–55° C. for 18 hours. The mixture is cooled, 3 parts of sodium acetate are added and then it is diluted with 250 parts of water. 4-chloro-6-p-nitroanilino-2-methylpyrimidine is precipitated, filtered off and crystallised from butanol. It forms yellow needles of M. P. 271–272° C.

Example 19

4.5 parts of 4-chloro-6-(6'-bromo-2'-naphthylamino)-2-methylpyrimidine and 3.6 parts of β-diethylaminoethylamine are heated together for 6 hours at 150–160° C. The mixture is then cooled and worked up by the method described in Example 7. There is thus obtained 6-(6'-bromo-2'-naphthylamino)-4 - β - diethylaminoethylamino-2-methylpyrimidine which crystallises from petroleum ether (B. D. 100–120° C.) in colourless prisms of M. P. 129–131° C.

By working in a similar manner, but starting from the same chloro compound and using other appropriate diamines instead of the β-diethylaminoethylamine, there are obtained the following further compounds.

Example 20

6-(6'-bromo - 2'-naphthylamino)-4-γ-diethylaminopropylamino - 2-methylpyrimidine which crystallises from petroleum ether (B. P. 100–120° C.) in colourless flat prisms, M. P. 129–130° C.

Example 21

6-(6'-bromo-2'-naphthylamino)-4-γ-dimethylaminopropylamino-2-methylpyrimidine, colourless prisms, M. P. 132–134° C.

Example 22

6-(6'-bromo-2'-naphthylamino)-4 - γ-dibutylaminopropylamino-2-methylpyrimidine, colourless prisms, M. P. 91–93° C.

Example 23

6-(6'-bromo - 2'-naphthylamino)-4-δ-diethylamino-α-methyl-butylamino - 2 - methylpyrimidine, colourless prisms, M. P. 109–110° C.

The 4-chloro-6-(6'-bromo-2'-naphthylamino)-2-methylpyrimidine used as starting material in Examples 19–23 is conveniently made by heating 8.15 parts of 4:6-dichloro-2-methylpyrimidine, 10.5 parts of 6-bromo-β-naphthylamine, 60 parts of water, 40 parts of acetone and 1 part of concentrated hydrochloric acid together for 1½ hours under gentle reflux. The mixture is cooled, the solid which has separated off is filtered off and washed with water. It is then dissolved in hot ethanol, ammonia is added until the solution remains persistently alkaline and the mixture is poured into water. The solid which is precipitated is filtered off, washed with water, dried and crystallised from toluene whereupon it forms colourless prisms, M. P. 191–192° C.

Example 24

10 parts of 4-chloro-6-p-methoxyanilino-2:5-dimethylpyrimidine, 14 parts of β-diethylaminoethylamine and 0.1 part of potassium iodide are stirred and heated together at 150–160° C. for 6 hours. The mixture is then cooled, and dissolved in dilute hydrochloric acid. The solution is made alkaline with sodium hydroxide and the base which is liberated is separated off and extracted with 5% aqueous acetic acid. The acetic acid extract is clarified with decolourising carbon and is then made alkaline with sodium hydroxide. The base which is precipitated is extracted with chloroform, the chloroform solution is dried over potassium carbonate and the chloroform is distilled off. The residual oil is then distilled under diminished pressure whereby 6-p-methoxyanilino-4-β-diethylaminoethylamino-2:5 - dimethylpyrimidine is obtained as a colourless oil of B. P. 203° C./0.05 mm.

The base may be converted into its dihydrochloride by dissolving in 7% hydrochloric acid and evaporating the solution to dryness in vacuo at 50–60° C. The residue so obtained is dried and freed from residual hydrogen chloride by repeated evaporation to dryness in vacuo at 40–50° C., first with ethanol and then with a mixture of ethanol and benzene. Finally the dried residue is crystallised from a mixture of alcohol and ethyl acetate, whereby 6-p-methoxyanilino-4-β-diethylaminoethylamino-2:5 - diethylaminopyrimidine dihydrochloride is obtained in the form of colourless prisms of M. P. 254–255° C.

The 4-chloro-6-p-methoxyanilino-2:5-dimethylpyrimidine used as starting material in Example 24 is conveniently made by heating together 5.3 parts of 4:6-dichloro-2:5-dimethylpyrimidine, 4.5 parts of p-anisidine, 30 parts of glacial acetic acid and 0.05 part of potassium iodide at 40–50° C. for 20 hours. 4 parts of sodium acetate are then added and the solution is poured into 300 parts of water. A solid separates out on standing. This is filtered off, dried and crystallised from n-butanol. It then forms colourless crystals of M. P. 201° C.

Example 25

14.6 parts of 4-chloro-6-p-chloroanilino-2:5-dimethylpyrimidine, 15 parts of β-diethylaminoethylamine and 0.15 part of potassium iodide are stirred and heated together at 150–160° C. for 6 hours. The mixture is cooled and dissolved in dilute hydrochloric acid and then worked up by the method described in Example 24. 6-p-chloroanilino-4-β-diethylaminoethylamino-2:5-dimethylpyrimidine is thus obtained as a colourless oil of B. P. 200° C./0.07 mm. The dihydrochloride crystallises from a mixture of ethanol and ethyl acetate in colourless prisms of M. P. 263–264° C.

By working in a similar manner to that described in Example 25 and using the same chloropyrimidine as starting material but other diamines instead of the β-diethylaminoethylamine, the following further compounds are obtained.

Example 26

6-p-chloroanilino - 4 - γ - diethylaminopropylamino-2:5-dimethylpyrimidine; this is a colourless oil of B. P. 204° C./0.045 mm. The dihydrochloride crystallises from a mixture of ethanol and ethyl acetate in the form of colourless prisms of M. P. 217–218° C.

Example 27

6-p-chloroanilino-4-γ - dimethylaminopropylamino-2:5-dimethylpyrimidine; this is a solid which crystallises from petroleum ether (B. P. 60–80° C.) in colourless prisms of M. P. 105° C. The dihydrochloride crystallises from a mixture of ethanol and ethyl acetate, M. P. 275–276° C. (decomp.).

Example 28

6-p-chloroanilino-4-δ-diethylamino-α- methyl-butylamino-2:5-dimethylpyrimidine which is a colourless oil of B. P. 205° C./0.055 mm.

The 4-chloro-6-p-chloroanilino-2:5-dimethylpyrimidine used as starting material in Examples 25–28 is conveniently made by heating together 8.8 parts of 4:6-dichloro-2:5-dimethylpyrimidine, 6.4 parts of p-chloroaniline, 40 parts of water, 20 parts of acetone and 2 parts of concentrated hydrochloric acid under reflux for 3 hours. A clear solution is obtained. This is cooled and then diluted with water and made alkaline with ammonia. The solid which separates is filtered off and crystallised from ethanol. 4-chloro-6-p-chloroanilino-2:5-dimethylpyrimidine is thus obtained as colourless prisms of M. P. 176–177° C.

Example 29

20 parts of 4-chloro-6-p-chloroanilino-2-methyl-5-ethylpyrimidine, 20 parts of β-diethylaminoethylamine and 0.2 part of potassium iodide are stirred and heated together for 6 hours at 140–150° C. The mixture is then cooled and dissolved in dilute hydrochloric acid and the solution is filtered and then made alkaline with sodium hydroxide. A precipitate is formed. The aqueous layer is decanted off and the residue is dissolved in dilute acetic acid. The acetic acid solution is filtered and made alkaline with sodium hydroxide. The base which is liberated is extracted with benzene; the benzene extract is dried and the benzene is distilled off. 6-p-chloroanilino-4-β-diethylaminoethylamino - 2 - methyl-5-ethylpyrimidine remains as an oil which is converted into its dihydrochloride by the method described in Example 24. The dihydrochloride crystallises from a mixture of ethanol and ethyl acetate in colourless prisms, M. P. 268°–270° C. (decomp.).

By working in a similar manner using the same chloropyrimidine but other appropriate diamines instead of the β-diethylaminoethylamine there are obtained the following further compounds.

Example 30

6-p-chloroanilino - 4 - γ - diethylaminopropylamino-2-methyl-5-ethylpyrimidine dihydrochloride, M. P. 278–279° C. (decomp.). The corresponding dipicrate crystallises from ethanol in yellow laminae, M. P. 171–173° C.

Example 31

6-p-chloroanilino - 4 - γ - diethylaminopropylamino-2-methyl-5-ethylpyrimidine which is a colourless oil, B. P. 210° C/0.065 mm. The dihydrochloride has M. P. 162° C.

The 4 - chloro-6-p-chloroanilino-2-methyl-5-ethylpyrimidine used as starting material in Examples 29–31 is conveniently made by heating together 5.73 parts of 4:6-dichloro-2-methyl-5-ethylpyrimidine, 4.3 parts of p-chloroaniline, 30 parts of acetic acid and 0.05 part of potassium iodide for 20 hours at 35–45° C. 3 parts of sodium acetate are then added and the solution is poured into water. The precipitate which is formed is filtered off, dried and crystallised from a mixture of benzene and petroleum ether (B. P. 60°–80° C.); it forms colourless rectangular prisms of M. P. 166° C.

Example 32

2.75 parts of 4-chloro-6-p-methoxyanilino-2-methyl-5-ethylpyrimidine and 2.5 parts of β-diethylaminoethylamine are heated together for 8 hours at 155–165° C. and the mixture is then worked up as described in Example 29. There is thus obtained 6-p-methoxyanilino-4-β-diethylaminoethylamino-2-methyl - 5 - ethylpyrimidine dihydrochloride which crystallises from a mixture of ethanol and ethyl acetate in colourless laminae of M. P. 250°–251° C. (decomp.).

Example 33

By working in the manner described in Example 32 and starting with the same chloropyrimidine but using γ-dimethylaminopropylamine instead of the β-diethylaminoethylamine, there is obtained 6-p-methoxyanilino-4-γ-dimethylaminopropylamino - 2 - methyl - 5 - ethylpyrimidine which crystallises from petroleum ether (B. P. 80–100° C.) in colourless needles of M. P. 106–107° C.

The 4-chloro-6-p-methoxyanilino-2-methyl-5-ethylpyrimidine used as starting material in Examples 32 and 33 is made by condensing 4:6-dichloro-2-methyl-5-ethylpyrimidine with p-chloroaniline in acetic acid in presence of potassium iodide exactly as described above for the corresponding 6-p-chloroanilino derivative. It crystallises from dilute ethanol in colourless elongated rectangular prisms, M. P. 157° C.

Example 34

2 parts of 4-chloro-6-amino-5-methylpyrimidine (M. P. 237°–238° C., made by halogenation of 4:6-dihydroxy-5-methylpyrimidine with phosphorus oxychloride to yield the 4:6-dichloro compound of M. P. 56.5°–57.5° C. and subsequent reaction with ammonia in ethanol at 140° C. for 3 hours), 6.5 parts of β-diethylaminoethylamine and 10 parts of β-butoxyethanol are heated together under reflux for 6 hours. The β-butoxyethanol and the excess of the diamine are then distilled off under diminished pressure and the residue is further worked up by the method described in Example 1. The 6-amino-4-(β-diethylaminoethylamino)-5 - methylpyrimidine so obtained is a viscous oil which distils at $10^{-3}$ mm. from a bath at 200° C. and after crystallisation from a mixture of benzene and light petroleum has M. P. 95.5°–96.5° C.

Example 35

By working in the manner described in Example 34 and starting from the same chloropyrimidine but using γ-diethylaminopropylamine instead of the β-diethylaminoethylamine, there is similarly obtained 6-amino-4-(γ-diethylaminopropylamino)-5-methylpyrimidine of M. P. 93°–94° C.

Example 36

5.6 parts of 4-chloro-6-(δ-diethylamino-α-methylbutylamino)-2-methylpyrimidine and 28 parts of δ-diethylamino-α-methylbutylamine are boiled together under reflux for 6 hours. The excess of the diamine is then distilled off in vacuo, the residue is dissolved in dilute hydrochloric acid and the solution is added to an excess of sodium hydroxide solution. The oil which is precipitated is extracted with ether, the ether solution is dried and the ether is distilled off. The residue is distilled in vacuo whereby 4:6-bis-(δ-diethylamino-α-methylbutylamino)-2-methylpyrimidine is obtained in the form of a viscous oil of B. P. 210° C. at $10^{-3}$ mms. pressure.

The 4-chloro - 6 - (δ - diethylamino - αmethylbutylamino)-2-methylpyrimidine used as starting material in this example is made as follows. 28.9 parts of 4 - chloro- 6 - hydroxy - 2 -methylpyrimidine and 31.6 parts of δ-diethylamino-α-methylbutylamine are stirred and heated together at 150°–160° C. for 8 hours. To the viscous melt so obtained 180 parts of phosphorus oxychloride are added and the mixture is heated to reflux for 3 hours. A clear solution is formed. The excess of the diamine is then distilled off in vacuo and the residue is poured onto ice. The solution so obtained is made alkaline with caustic soda and the base which separates out is extracted with chloroform. The chloroform solution is dried, the chloroform is distilled off and the residue is distilled in vacuo whereby 4-chloro- 6-δ-diethylamino-α-methylbutylamino-2-methyl-pyrimidine is obtained as a viscous oil of B. P. 168°–170° C. at 0.125 mm. pressure.

*Example 37*

1.8 parts of 4 - chloro-6 - p-nitroanilino-2:5-dimethyl-pyrimidine (M. P. 208°–210° C., made by heating 4:6-dichloro-2:5-dimethylpyrimidine with p-nitroaniline for 18 hours at 55°–60° C. in glacial acetic acid and in presence of a trace of potassium iodide), 1.8 parts of β-diethylamino-ethylamine and 0.018 part of potassium iodide are heated together for 5 hours at 155°–165° C. The melt is dissolved in dilute hydrochloric acid and the solution is made alkaline with sodium hydroxide. The base which is precipitated is separated off and dissolved in aqueous 5% acetic acid. The solution is clarified with decolourising carbon and is then made alkaline with sodium hydroxide. The free base, 6-p-nitroanilino-4-β-diethyl-aminoethylamino-2:5-dimethyl-pyrimidine separates out as an oil. It is extracted with benzene, the solution is dried, the benzene is distilled off and the residue is crystallised from petroleum ether (B. P. 60°–80° C.). The base is thus obtained in the form of pale yellow crystals of M. P. 104°–106° C. The dihydrochloride crystallises from a mixture of ethanol and ethyl acetate in yellowish prisms of M. P. 254°–156° C.

*Example 38*

By starting from 4-chloro-6-p-chloro-anilino-2-phenylpyrimidine (M. P. 124° C., made by condensing p-chloroaniline with 4:6-dichloro-2-phenylpyrimidine in acetic acid) and β-diethyl-aminoethylamine and working in the manner described in Example 37, there is obtained 6-p-chloroanilino - 4 - β-diethylaminoethylamino-2-phenylpyrimidine. This is most conveniently purified by conversion to its picrate and subsequent regeneration of the base which then crystallises from petroleum ether (B. P. 40°–60° C.) with M. P. 78°–80° C. The dipicrate crystallises from acetone in yellow prisms of M. P. 210° C.

*Example 39*

8 parts of 4- chloro - 6 - p - chloroanilino - 2 - methyl-5-phenylpyrimidine, 8 parts of γ-diethyl-aminopropylamine and 0.08 part of potassium iodide are heated and stirred together at 150–160° C. for 8 hours. The melt is then dissolved in dilute hydrochloric acid and the solution is made alkaline with sodium hydroxide. The base which is precipitated is filtered off and dissolved in 5% acetic acid. The solution is filtered and made alkaline with sodium hydroxide and the base which is again precipitated is extracted with chloroform. The chloroform solution is dried and the chloroform is distilled off. The oil which remains is 4-p-chloro-anilino-6-γ-diethylamino-propylamino-2-methyl-5-phenyl-pyrimidine. It is crystallised from wet petroleum ether (B. P. 40–60° C.) in the form of a hydrate of M. P. 65°–66° C.

The starting material for this example is made by heating together 10.8 parts of 4:6-dichloro-2-methyl-5-phenylpyrimidine (M. P. 160° C., made by reaction of 4:6-dihydroxy-2-methyl-5-phenylpyrimidine with phosphorus oxychloride), 5.8 parts of p-chloroaniline and 3 parts of acetic acid at 130°–140° C. for 2 hours. The reaction mixture is dissolved in alcohol. The alcohol solution is made alkaline with ammonia and poured into water. An oil is precipitated which crystallises on standing. This is filtered off, washed with water and dried. After crystallisation from alcohol it forms colourless prisms of M. P. 155–156° C.

Whereas the above description and examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

We claim:

1. As new compounds, the free base form and salts of the pyrimidine derivatives of the formula

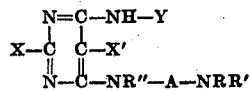

wherein X and X' designate members selected from the group consisting of hydrogen, lower alkyl and phenyl; Y stands for a member of the group consisting of hydrogen and aromatic radicals not higher than naphthyl and whereof the nucleus bears a substituent selected from the group consisting of halogen, alkoxy and nitro; R'' is a member of the group consisting of hydrogen and lower alkyl; A is a linking radical selected from the group consisting of aliphatic, alicyclic and aliphatic-carbocyclic radicals; while NRR' represents a basic radical selected from the group consisting of monoalkylamines, dialkylamines and piperidine.

2. As new compounds, the free base form and salts of the pyrimidine derivatives of the formula

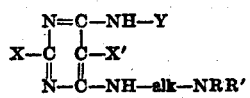

wherein X and X' designate members selected from the group consisting of hydrogen, lower alkyl and phenyl; Y stands for a member of the group consisting of hydrogen and aromatic radicals not higher than naphthyl and whereof the nucleus bears a substituent selected from the group consisting of halogen, alkoxy and nitro; alk is a lower alkylene radical, while NRR' represents a basic radical selected from the group consisting of monoalkylamines, dialkylamines and piperidine.

3. As new compounds, the free base form and salts of the pyrimidine derivatives of the formula

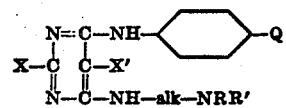

wherein X and X' designate members of the group consisting of hydrogen, lower alkyl and phenyl; Q stands for a member of the group consisting of halogen, methoxy and nitro; alk is a is a lower alkylene radical, while NRR' represents a basic radical selected from the group consisting of monoalkylamines, dialkylamines and piperidine.

4. As new compounds, the free base form and salts of 6-p-chloroanilino-4-βdiethylamino-ethyl-amino-2-methyl-pyrimidine.

5. As new compounds, the free base form and salts of the pyrimidine derivatives of the formula

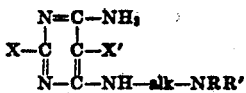

wherein X and X' designate members of the group consisting of hydrogen, lower alkyl and phenyl; alk is a lower alkylene radical, while NRR' represents a basic radical selected from the group consisting of monoalkylamines, dialkylamines and piperidine.

6. As new compounds, the free base form and salts of 6 - amino - 4 - (β - diethylamino - ethylamino)-2:5-dimethyl-pyrimidine.

7. As new compounds, the free base form and salts of 6-amino-4-(β-diethylamino-ethylamino)-2-methyl-pyrimidine.

8. Process for the manufacture of pyrimidine compounds as defined in claim 1, which comprises reacting a diamine of the form NHR''—A—NRR', wherein R'', A and NRR' have the same significance as in claim 1, with a pyrimidine compound of the formula

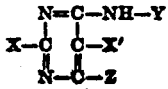

wherein X and X' designate members selected from the group consisting of hydrogen, lower alkyl and phenyl; Y stands for a member of the group consisting of hydrogen and aromatic radicals not higher than naphthyl and whereof the nucleus bears a substituent selected from the group consisting of halogen, alkoxy and nitro; while Z is a labile substituent selected from the group consisting of halogen, alkoxy, arloxy and alkylmercapto, whereby the labile substituent is replaced by the radical NRR''—A—NRR''.

9. Process for the manufacture of compounds as defined in claim 4, which comprises reacting β-diethylamino-ethylamine with 4-chloro-6-p-chloroanilino-2-methyl pyrimidine.

10. Process for the manufacture of compounds as defined in claim 5, which comprises reacting with a dialkylamino-alkylamine upon a 4-chloro-6-amino-pyrimidine whose 2- and 5-positions bear substituents selected from the group consisting of hydrogen, lower alkyl and phenyl.

FREDERICK ROBERT BASFORD.
FRANCIS HENRY SWINDEN CURD.
FRANCIS LESLIE ROSE.
HARRY TACON OPENSHAW.
ROY HULL.
ALEXANDER ROBERTUS TODD.

No references cited.